Figure 3:
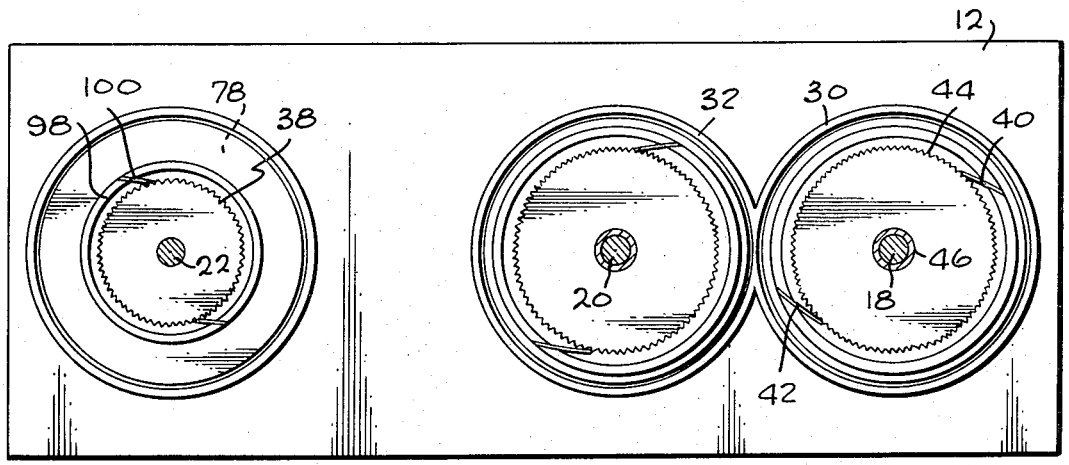

United States Patent
Stewart

[15] 3,696,531
[45] Oct. 10, 1972

[54] EQUATION APPARATUS

[72] Inventor: Larry C. Stewart, 7104 Jordan Ave., Apt. 4, Canoga Park, Calif. 91304

[22] Filed: May 17, 1971

[21] Appl. No.: 143,913

[52] U.S. Cl. .............................................. 35/31 A
[51] Int. Cl. ............................................. G09b 19/02
[58] Field of Search ......... 35/31 R, 31 A, 31 B, 31 C, 35/30, 9 R

[56] References Cited

UNITED STATES PATENTS

| | | | |
|---|---|---|---|
| 1,948,712 | 2/1934 | Hornung | 35/31 C X |
| 2,618,868 | 11/1952 | Medlock | 35/31 A |
| 2,643,467 | 6/1953 | Goodwin | 35/31 A |

FOREIGN PATENTS OR APPLICATIONS 650,205   2/1951   Great Britain ............. 35/31 R

*Primary Examiner*—Wm. H. Grieb
*Attorney*—Allan M. Shapiro

[57] ABSTRACT

Equation apparatus has at least first, second, and third number dials which are manually movable to indicate particular digits. An output indicator is connected to all three of the dials, to signal when an equation is satisfied by the digits on the dials. Each of the dials has a manual knob. A one-way drive interconnects these parts to the output indicator so that each manually movable structure and number dial can be individually turned independent of the other number dials.

26 Claims, 12 Drawing Figures

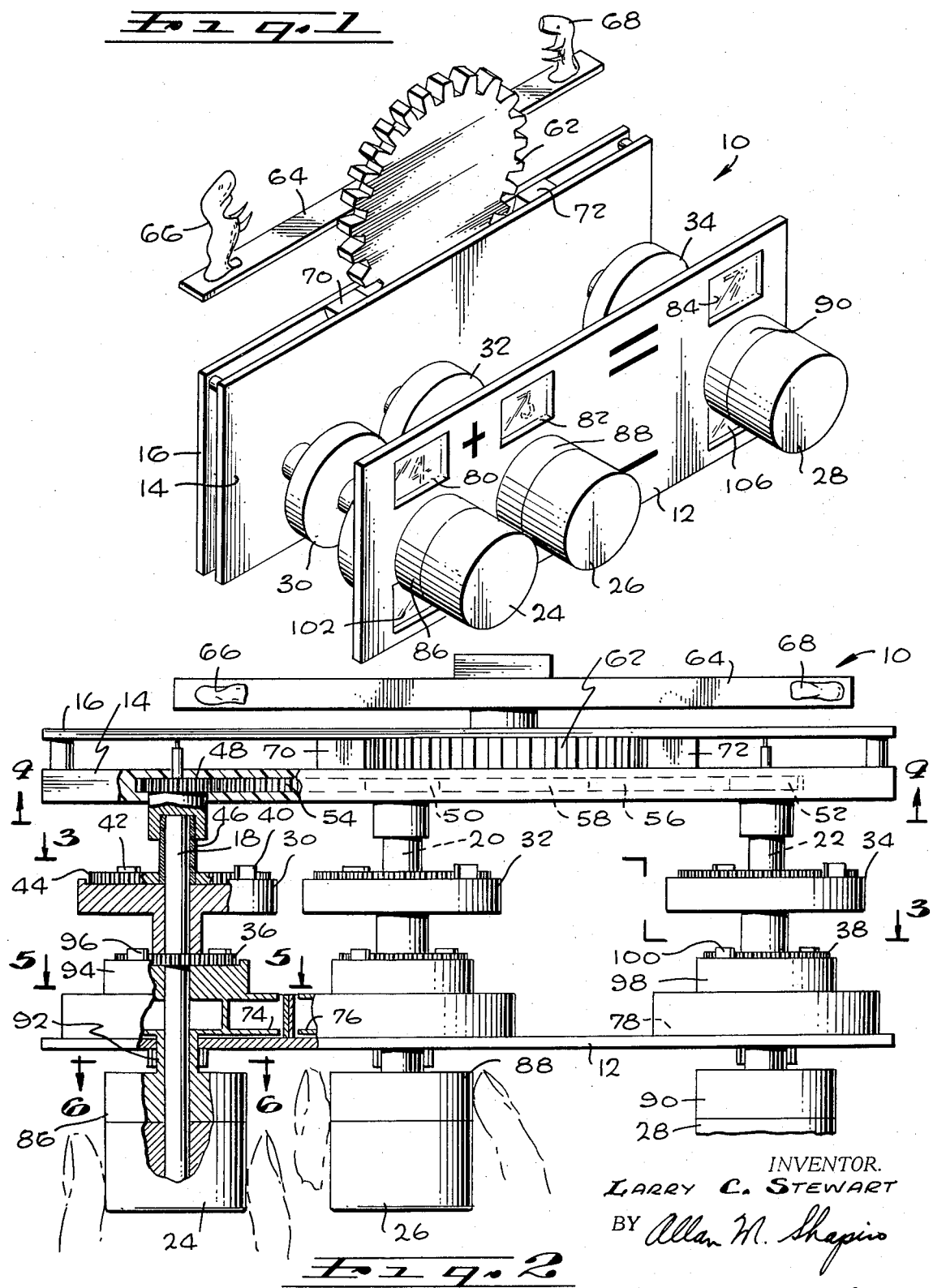

PATENTED OCT 10 1972 3,696,531

LARRY C. STEWART
INVENTOR.

BY Allan M. Shapiro

ATTORNEY

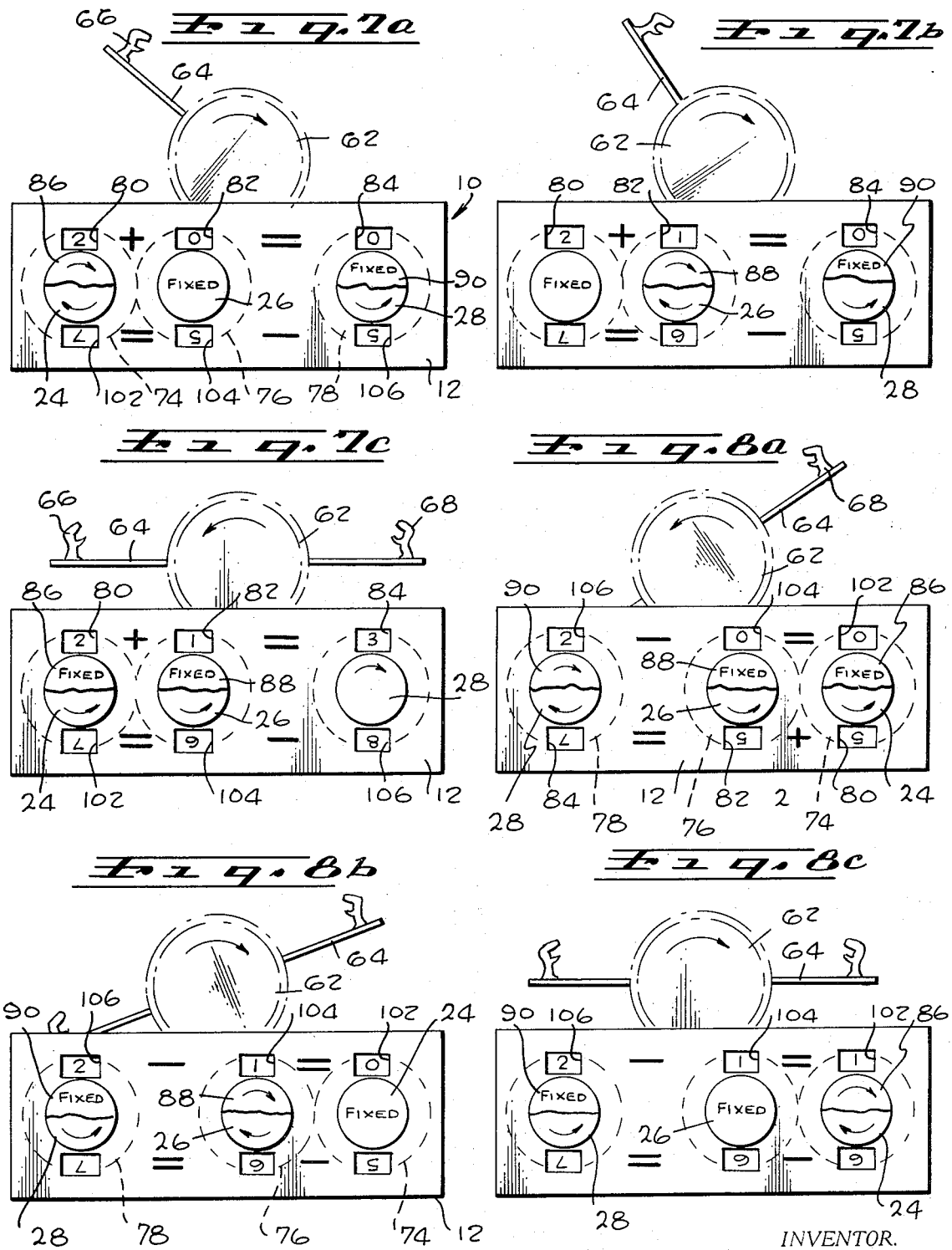

EQUATION APPARATUS

BACKGROUND OF THE INVENTION

1. Field Of The Invention

This invention is directed to an equation apparatus which acts as a teaching device to show the user when a mathematical equation is solved. It is particularly useful as a teaching device for single digit addition and subtraction problems.

2. Description Of The Prior Art

The most common teaching means for teaching elementary arithmetic, particularly addition and subtraction, comprises the arrangement of numbers in tabular form so that the sum is indicated at an intersection. These tabular devices are widely known as addition tables, and appear to have been used in teaching arithmetic virtually since its inception.

Another prior art effort at providing teaching equipment for problems in addition and subtraction has been the balance scale where the application of weights to a scale arm results in its deflection, to indicate a result or to indicate that equality has not been accomplished. These devices are useful, but require loose weights, or the like, which can be placed upon the scale or moved so that moment arm equality is established to result in scale balance.

Few devices which have mechanically interconnected structures have been produced. One of them is merely a modernization of the old tabular form, which brings up columns beneath a visible window upon adjustment. Another employs levers to produce a sum, with a readout being related to the lever position. Another prior art device relates multiplication to the relative rotation of interengaged gears. Different gear diameters result in the indication of different equation situations. However, less than a full turn of such gears causes difficulties in interpretation of results.

The prior art, thus, leaves much to be desired, for there is no adequate teaching device which is economic of manufacture, and easy to use so that it presents an interesting challenge to the young students who are learning arithmetic, for these students must have a device which is simple of operation, reliable and accurate in results. Furthermore, the prior devices have not conveniently indicated both addition and subtraction situations, so there is much need for teaching devices of such nature.

SUMMARY OF THE INVENTION

In order to aid in the understanding of this invention, it can be stated in essentially summary form that it is directed to an equation apparatus. The equation apparatus has at least three number wheels, and has a manually movable structure connected to move the number wheels. The wheels are moved to a position where equality is accomplished in the equation.

First, second, and third shafts 18, 20 and 22 respectively carry main operating knobs 24, 26 and 28 secured to their front ends. Carriers 30, 32 and 34 are respectively secured on the shafts. Carriers 30, 32 and 34 are identical and thus only carrier 30 will be described. Fixed to the forward end of carrier 30, that is, closest to the cover plate 12 and first knob 24, is a rachet wheel 36. The corresponding ratchet wheel driven by third main operating knob 28 is indicated at 38 in FIG. 3. The first carrier 30 is secured to shaft 18 to rotate therewith, and is in the form of a disc. Secured to the disc and facing inwardly are pawls 40 and 42 (see FIG. 3).

Figure 4:
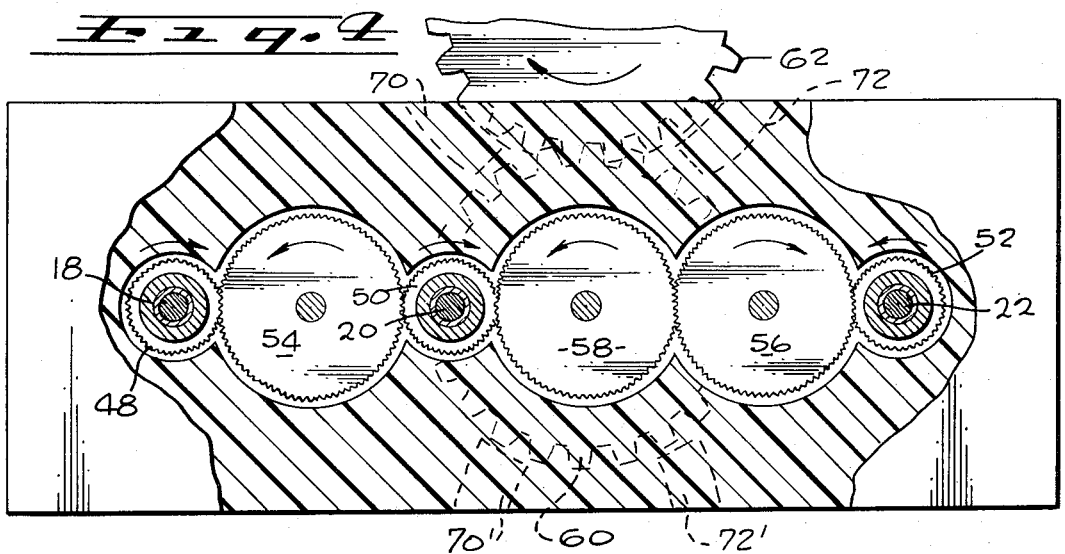
Figure 5:
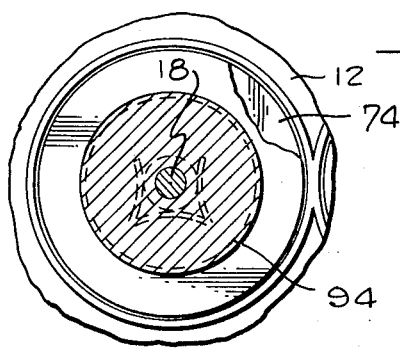

Positioned within the engagement of pawls 40 and 42 is ratchet wheel 44. The pawls and the ratchet wheel are arranged so that, when knob 24 and first shaft 18 are rotated in the clockwise direction, as seen in FIGS. 1 and 4, such clockwise rotation of shaft 18 drives ratchet wheel 44 in the clockwise direction. Ratchet wheel 44 is mounted upon sleeve 46 which is freely rotatable on the exterior of shaft 18. The forward end of sleeve 46 carries pinion 48 secured thereto for rotation therewith. By this construction, clockwise rotation of knob 24 rotates shaft 18 in the clockwise direction, and similarly rotates first carrier 30 and its pawls 40 and 42 in the clockwise direction. Such rotation causes the pawls to drive ratchet wheel 44, sleeve 46 and pinion 48 in the clockwise direction. However, counter-clockwise rotation of knob 24 would not rotate pinion 48 because of the non-drive of the pawls in this direction. Similarly, clockwise rotation of pinion 48 would not cause rotation of first carrier 30.

Support plate 14 is preferably laminated, of three layers, to provide pockets therein. As illustrated in FIG. 2, support plate 14 has substantially continuous front and rear layers, but the middle layer thereof has larger holes for the reception of gears, as is illustrated in FIG. 4. The rear ends of shafts 18, 20 and 22 respectively carry first, second and third pinions 48, 50 and 52. As indicated with respect to first pinion 48, these pinions are not directly driven by the shafts on which they are supported, but are respectively driven through carriers 30, 32 and 34 so that the pinions rotate in a clockwise direction when their respective main operating knobs are rotated in the clockwise direction.

Idler 54 is mounted in support plate 14 and is in gear-tooth engagement with both pinions 48 and 50. Idler 56 is in gear-tooth engagement with pinion 52, and engages with indicator carrier gear 58. Indicator carrier gear 58 is also in gear-tooth engagement with pinion 50. The three pinions, the two idlers, and the indicator carrier gear are in constant mesh so that, when one rotates, the others must rotate. The direction of rotation of all of the gears is shown by arrows in FIG. 4, when pinion 48 or pinion 50 is rotated in the clockwise direction; each of the direction arrows of rotation would be reversed when pinion 52 is rotated in the clockwise direction.

Indicator carrier gear 58 is connected to drive indicator support gear 60, and mounted on top of the indicator support gear 60 is indicator gear 62. The indicator gear 62 may carry a transverse bar 64 thereon which preferably has characteristic configurations on the ends to indicate the difference between one orientation of the indicator gear 62, as compared to an orientation 180° therefrom, i.e., upside-down. FIGS. 66 and 68 are ornamental and attractive and satisfy this purpose.

Indicator gear 62 is loosely seated on the top of indicator support gear 60, but is guided to remain in the correct position by guides 70 and 72. An additional set of guides 70' and 72' are provided on the opposite side, as seen in FIG. 4, for purposes hereinafter described.

Figure 6:
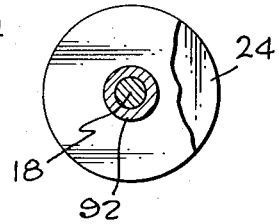

First, second and third number dials or wheels 74, 76 and 78 are respectively mounted for rotation about shafts 18, 20 and 22, and are positioned directly behind cover plate 12. The number wheels each carry the 10 digits, i.e., "0" to "9" inclusive, equally spaced therearound, to be respectively visible through windows 80, 82 and 84 in front plate 12. Adjustment knobs 86, 88 and 90 are also rotatably mounted on shafts 18, 20 and 22, and the adjustment knobs are connected to the respective number wheels by means of sleeves extending through the front plate. One of these sleeves is indicated at 92 in FIGS. 2 and 6. Thus, manual engagement and rotation in either direction of any of the adjustment knobs causes corresponding rotation of the number wheel connected thereto.

The rear of each of the number wheels has a pawl carrier thereon. The pawl carrier on the rear of number wheel 74 is shown at 94, as carrying pawl 96. Similarly, the pawl carrier on the rear of number wheel 78 is indicated at 98 and its pawl is shown at 100, in FIGS. 2 and 3. These pawls engage upon the ratchet wheels at the front of carriers 30, 32 and 34, respectively, and are oriented in such a manner that, when the adjustment knobs 86 through 90 are individually manually rotated in the clockwise direction, only the connected number wheel rotates. However, when one of the ratchet wheels mounted on the front of pawl carriers 30 through 34 is rotated in the clockwise direction, engagement by the pawl on the number wheel causes clockwise rotation of the number wheel.

The gears described as driving the indicator gear 62 and indicator bar 64 are illustrative of the positive drive means. Other types of positive drive means could be employed instead of the gears, idlers and pinions. One example of an economic and positive drive means of suitable character is the beadchain, with special positively engaging beadchain sprockets.

In operation, the equation apparatus 10 is preferably placed upon a horizontal surface in the orientation illustrated in FIG. 7a. Indicator gear 62 with its bar is placed on the top of the equation apparatus, with the bar in a horizontal position. The numbers on number wheels 74 through 78 which are visible through windows 80 through 84 are set to zero by respectively grasping the adjustment knobs 86 through 90 and individually turning these knobs in the clockwise direction until a zero appears in each of the windows. Such clockwise motion of the adjustment knobs results in turning of the number wheels without any other activity in the equation apparatus, because the pawl on the rear of the number wheel ratchets around its ratchet wheel without driving. For example, pawl 96 ratchets around ratchet wheel 36 without driving ratchet wheel 36.

The first step in employing the equation apparatus to test a set of numbers to see if they fit the equation is to first turn one of the main operating knobs such as knob 24 in the clockwise direction until the selected number appears in window 80. In FIG. 7a, the number "2" is the selected number. With the turning of the main operating knob 24, carrier 30 turns in the clockwise direction, which causes drive of the number wheel 74, in this case, until the number "2" is reached, and causes drive of pinion 48 through pawl 40 and ratchet wheel 44. For this rotation of pinion 48, all the gears in support plate 14 turn in the directions indicated by the arrows. The rotation of indicator gear 62 tilts the bar 64, as illustrated in FIG. 7a. This rotation of the gears in support plate 14 does not turn number wheel 76, because the pawl in pawl carrier 32 does not drive when pinion 50 is driven in the clockwise direction. Similarly, while pinion 52 drives pawl carrier 34, because it is rotating in the counter-clockwise direction, and thus knob 28 rotates in the counter-clockwise direction, as indicated in FIG. 7a, the number wheel 78 does not turn because this is the free turning direction of pawl 100 with respect to ratchet wheel 38. Thus, the originally set zeros in windows 82 and 84 remain set at zero.

FIG. 7b illustrates the next step in operation, where main operating knob 26 is turned in the clockwise direction to bring up the selected number in window 82. The selected number is the number "1," as seen in FIG. 7b. As the operating knob 26 and the number wheel turn in the clockwise direction, pinion 50 is also driven in the clockwise direction by the same mechanization as previously described with respect to pinion 48. This drives indicator gear 62 and its bar 64 farther in the clockwise direction, as is indicated in FIG. 7b.

As the final step in determining whether or not the selected numbers fit the equation, main operating knob 28 is turned in the clockwise direction until the selected number shows through window 84. In this case, the number "3" is selected. Rotation of the main operating knob in the clockwise direction causes clockwise rotation of pinion 52. Such rotation causes rotation of all the gears illustrated in FIG. 4 in the direction opposite to the arrows shown therein. Rotation occurs until the selected number shows in window 84. If the equation is satisfied, rotation of gear 60 in the clockwise direction caused by clockwise rotation of pinion 52 is the same in amount as the original counter-clockwise rotation thereof caused by driving through pinions 48 and 50. In the present case, the equation tested is an addition equation illustrated by the plus sign between windows 80 and 82 and the equals sign between windows 82 and 84 on the upper half of cover plate 12, as seen in FIGS. 1 and 7.

The importance of having significant upper and lower sides on bar 64 is seen when the two numerals for addition add up to "10" or more. For example, when "5" plus "5" are dialed into the main operating knobs 24 and 26, indicator gear 62 and its bar 64 rotate 180°. "5" plus "5" equals "0" (but read as "10" because only the first decade is shown in the number wheels) is correct, the factor of "10" involved is indicated by the bar 64 being upside down. The bar is righted to its correct position by a full revolution of main operating knob 28, which rotates the number wheel 78 a full decade to more correctly indicate the propriety of the equation.

The equation apparatus 10 can be employed in two basic ways, employing the addition equation. In one manner of use, numbers can be selected for each of the three windows and the horizontal or tilted condition of bar 64 states whether or not these values satisfy the equation. In the other use, numbers can be selected for any two of the windows, and the number in the third window can be continuously changed until the horizontal condition of bar 64 indicates that the equation is satisfied, and thus the value for this equation satisfaction is indicated in the third window.

The same equation apparatus 10 can be turned over on its supporting surface to show windows 102, 104 and 106 through which the number wheels 74, 76 and 78 are respectively visible (see FIG. 8a. Windows 102 and 104 are separated by an equals sign, while windows 104 and 106 are separated by a minus sign. When the indicator gear 62 with its bar 64 is placed on top of the indicator support gear 60, when the equation apparatus 10 is in this orientation, the apparatus is useful for solving subtraction equations. Operation is similar to that previously described. First, the number wheels are set to zero as by clockwise rotation of the adjustment knobs, and indicator bar 64 is set in the level position.

As the first step in employing equation apparatus 10 as a subtracting device, main operating knob 28 is turned in the clockwise direction to a selected number on the number wheel 78 visible through window 106. In this case, the number is the numeral "2," as illustrated in FIG. 8a. During this rotation of main operating knob 28, the bar 64 rocks as indicated, and knobs 24 and 26 rotate in the counter-clockwise direction, without rotation of their respective number wheels.

Next, main operating knob 26 is turned in the clockwise direction, until the number wheel 76 shows a selected number through window 104. In this case, the selected number is "1," as indicated in FIG. 8b. During this rotation, main operating knob 28 rotates in the counter-clockwise direction, but the number wheels 74 and 78 do not move. The bar 64 rocks partway back to its horizontal position. Finally, knob 24 is rotated in the clockwise direction until the selected number shows through window 102 and number wheel 74. In this case, the number "1" is selected, as shown in FIG. 8c. This satisfies the subtraction equation, as indicated by the horizontal condition of bar 64. In subtraction, as well as in addition, the equation apparatus can be employed either to determine whether or not three selected numbers satisfy the equation, or to determine the third number which satisfies the equation, when two are preselected.

Indicator carrier gear 58, indicator support gear 60, indicator gear 62, and bar 64 provide a means for indicating when the indicator carrier gear 58 has returned to its original angular position. The preferred embodiment illustrated is particularly satisfactory because the equation apparatus 10 is intended as a teaching device for children, and such an external bar 64 tends to correlate the "balancing" concepts involved in both teeter-totters and equations. However, other indicator means, such as an electric switch which is closed when the indicator carrier gear 58 returns to its initial position, can be employed to signal when this event has occurred.

The equation apparatus 10 is such that it is economic of construction, and yet is accurate. Synthetic polymer composition materials can be used for most of the parts, and as an added feature for attention-getting employment by a child, many of the components can be made of transparent synthetic polymer composition material so that the moving parts can be observed during operation. It may be convenient to enclose the equation apparatus by side plates around the plates 12, 14 and 16, but in such case, these side plates should be made of transparent material for the reason of visibility.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An equation apparatus comprising:

first, second and third operating knobs;

first, second, and third number wheels having numbers thereon;

drive means coupling said operating knobs to respective said number wheels in driving relationship thereto;

indicator means for indicating satisfaction of an equation; and means interconnecting said operating knobs and said indicator means for driving said indicator means from said operating knobs so that equation satisfaction is indicated by said indicator means when said operating knobs turn said number wheels so that such numbers on said number wheels indicate satisfaction of an equation.

2. The equation apparatus of claim 1 wherein said drive means between said operating knob and said number wheel is a one-way drive means.

3. The equation apparatus of claim 2 wherein said one-way drive means comprises a pawl in engagement with a ratchet wheel.

4. The equation apparatus of claim 3 wherein said pawl and ratchet wheel are arranged so that said operating knob turns said number wheel when said operating knob is turned in a clockwise direction.

5. The equation apparatus of claim 1 wherein said means interconnecting said operating knob and said indicator means includes a one-way drive mechanism.

6. The equation apparatus of claim 5 wherein said one-way drive mechanism is a pawl engaging a ratchet wheel.

7. The equation apparatus of claim 6 wherein said interconnecting means includes a plurality of pinions, each being connected to be driven by each of said operating knobs, said pinions being geared together.

8. The equation apparatus of claim 7 wherein said drive means between said operating knob and said number wheel is a one-way drive means.

9. The equation apparatus of claim 8 wherein said one-way drive means comprises a second pawl in engagement with a second ratchet wheel.

10. The equation apparatus of claim 9 wherein said second pawl and ratchet wheel are arranged so that said operating knob turns said number wheel when said operating knob is turned in a clockwise direction.

11. The equation apparatus of claim 1 wherein said means interconnecting said indicator means and said operating knobs comprises second drive means connected to each of said operating knobs to be driven by said operating knobs.

12. The equation apparatus of claim 11 wherein said second drive means comprises a separate pinion driven by each of said operating knobs, said separate pinions being connected together in gear-tooth engagement.

13. The equation apparatus of claim 12 wherein the pinion driven by said first operating knob is in engagement with a first idler and said first idler is in engagement with said pinion driven by said second operating knob, so that when one of said pinions is rotated, the other of said pinions rotates in the same direction.

14. The equation apparatus of claim 13 wherein said pinion driven by said third operating knob is in engagement with a second idler, and said second idler is in engagement with an indicator carrier gear, said indicator carrier gear being in engagement with said second pinion so that, when said first and second pinions rotate in one direction, said third pinion rotates in an opposite direction.

15. The equation apparatus of claim 14 wherein said indicator means comprises an indicator gear driven by said indicator carrier gear.

16. The equation apparatus of claim 15 wherein an indicator bar is secured to said indicator gear, said indicator bar showing when said indicator gear indicates satisfaction of the equation.

17. The equation apparatus of claim 14 wherein said drive means between said operating knob and said number wheel is a one-way drive means.

18. The equation apparatus of claim 17 wherein said one-way drive means comprises a pawl in engagement with a ratchet wheel.

19. The equation apparatus of claim 18 wherein said pawl and ratchet wheel are arranged so that said operating knob turns said number wheel when said operating knob is turned in a clockwise direction.

20. The equation apparatus of claim 14 wherein said second drive means includes a one-way drive mechanism.

21. The equation apparatus of claim 20 wherein said one-way drive mechanism is a pawl engaging a ratchet wheel.

22. The equation apparatus of claim 21 wherein said drive means between said operating knob and said number wheel is a one-way drive means.

23. The equation apparatus of claim 22 wherein said one-way drive means comprises a second pawl in engagement with a second ratchet wheel.

24. The equation apparatus of claim 23 wherein said second pawl and ratchet wheel are arranged so that said operating knob turns said number wheel when said operating knob is turned in a clockwise direction.

25. The equation apparatus of claim 24 wherein said indicator means comprises an indicator gear driven by said indicator carrier gear.

26. The equation apparatus of claim 25 wherein an indicator bar is secured to said indicator gear, said indicator bar showing when said indicator gear indicates satisfaction of the equation.

* * * * *